(12) United States Patent
Arévalo Rodríguez et al.

(10) Patent No.: US 8,096,504 B2
(45) Date of Patent: Jan. 17, 2012

(54) INTEGRATED AIRCRAFT STRUCTURE IN COMPOSITE MATERIAL

(75) Inventors: Elena Arévalo Rodríguez, Madrid (ES); Pedro Luis Muñoz Royo, Madrid (ES)

(73) Assignee: Airbus Operations, S.L., Madrid (ES)

( * ) Notice: Subject to any disclaimer, the term of this patent is extended or adjusted under 35 U.S.C. 154(b) by 976 days.

(21) Appl. No.: 12/201,362

(22) Filed: Aug. 29, 2008

(65) Prior Publication Data

US 2009/0283638 A1 Nov. 19, 2009

(30) Foreign Application Priority Data

May 16, 2008 (ES) .................................. 200801426

(51) Int. Cl.
*B64C 1/06* (2006.01)
(52) U.S. Cl. ...................................... 244/119; 244/131
(58) Field of Classification Search .............. 244/117 R, 244/119, 120, 131, 133
See application file for complete search history.

(56) References Cited

U.S. PATENT DOCUMENTS

| | | | | |
|---|---|---|---|---|
| 7,074,474 B2* | 7/2006 | Toi et al. | ........................ | 428/102 |
| 7,159,822 B2* | 1/2007 | Grantham et al. | ............ | 244/119 |
| 8,042,767 B2* | 10/2011 | Velicki et al. | ............. | 244/117 R |
| 2008/0265093 A1* | 10/2008 | Munoz Lopez et al. | ...... | 244/119 |
| 2008/0290214 A1* | 11/2008 | Guzman et al. | ............... | 244/119 |
| 2009/0057487 A1* | 3/2009 | Velicki et al. | ................. | 244/119 |
| 2010/0133380 A1* | 6/2010 | Roebroeks et al. | ........... | 244/119 |

* cited by examiner

*Primary Examiner* — Rob Swiatek
(74) *Attorney, Agent, or Firm* — Ladas & Parry LLP

(57) ABSTRACT

Integrated aircraft structure in composite material that comprises a skin and stringers (1), with the skin comprising a string part (5) and a basic skin (3), which structure further comprises U-shaped elements (15) each of which comprises in its turn two L-shaped sections (4*a*+5*a* and 4*b*+5*b*) together with the skin part (5), in such a way that these U-shaped elements (15) fulfill two structural functions in said structure at the same time, acting as frame feet and as skin, providing an integrated fuselage structure without rivets or joints. The invention also relates to a manufacturing process of an integrated aircraft structure in composite material.

15 Claims, 8 Drawing Sheets

INTEGRATED AIRCRAFT STRUCTURE IN COMPOSITE MATERIAL

FIELD OF THE INVENTION

The present invention relates to an integrated aircraft structure constructed in composite material, in particular for fuselages of aeronautical structures or for similar aircraft structures.

BACKGROUND OF THE INVENTION

It is common knowledge that the aeronautical industry requires structures that on the one hand withstand the loads to which they are subjected, meeting high requirements on strength and stiffness, and on the other hand are as light as possible. A consequence of this requirement is the more and more extensive use of composite materials in primary structures, because with appropriate application of said composite materials it is possible in consequence to achieve an important weight saving relative to a design in metallic material.

Integrated structures in particular have proved to be very efficient in this respect. We speak of an integrated structure when the different structural elements are manufactured in one step. This is another advantage of the use of composite materials because with their condition of independent layers that can be lay-up in the desired form, they offer the possibility of increasing integration of the structure, which moreover often produces a cost saving—equally essential when competing in the marketplace—as there are fewer individual parts to be assembled.

The main structure of aircraft fuselages is composed of skin, stringers and frames. The skin is reinforced longitudinally with stringers to reduce its thickness and so as to be competitive in weight, whereas the frames prevent general instability of the fuselage and may be subject to local loading. Within an aircraft fuselage we may encounter other structural elements, such as beams, which serve as framing for open sections of the fuselage or serve for supporting the loads introduced by the floor of the cabin of said aircraft.

Thus, the structure most used at present for a fuselage consists, on the one hand, of a skin with integrated, co-bonded or co-cured stringers and, on the other hand, of frames, and in their turn these frames can be floating or complete, being manufactured separately and being riveted subsequently to the skin of the fuselage.

The assembly of skin plus stringers can be manufactured in a single process (called one-shot), by which the skin, conical or cylindrical, is obtained together with the stringers in one piece, or alternatively said assembly of skin plus stringers can be manufactured separately in several panels (panelled solution) that are then joined together mechanically.

With regard to the frames, these can be, according to the prior art, floating or complete. In the case of the complete frames used at present, the manufacturing process is carried out in a large number of steps. The frames are manufactured separately, in several sections, and are joined mechanically to the skin, taking the form of said skin on resting on it. The problem posed by these known complete frames is that it is necessary to use complicated and expensive tooling to achieve the assembly tolerances required to enable said frames to be joined to the skin, taking into account the precise aerodynamic and structural requirements.

For the case of floating frames, the known manufacturing process also consists of several steps. The frames are manufactured separately but, apart from the sections that are required as a function of the panelling of the skin, the cross-section will consist of two different pieces: on the one hand, the floating frame as such and, on the other hand, the foot (piece called "babette" or "shear tie") which is joined to the skin by means of rivets, and in its turn the floating frame itself is riveted to the aforesaid foot. With this solution, manufacturing of the floating frame is simplified, so that, as it is not necessary to copy the shape of the skin, the tooling used is simpler, and at the same time the problem of assembly tolerances is improved. However, this known solution of floating frames has the drawback of increasing the number of parts, and therefore the number of joints required.

In the two cases already known, complete frames and floating frames, different assembly stations are needed and a large quantity of fasteners (basically rivets), which involves weight penalties, high costs of production and assembly, and the need for greater logistic capacity.

That is why in recent years much effort has been devoted to achieving an ever increasing level of integration in the production of fuselages in composite material, so as to avoid the disadvantages of the aforementioned known solutions. The problem caused by this integration resides basically in creating sufficient pressure in all the elements during the process of combined curing.

As a result of these endeavours, there are several patents that describe methods of manufacture which, with the aid of special curing tooling, make it possible to integrate some of the typical structural elements, assembling the remaining elements in the next assembly stages. This is so for Patents WO2008/025860A1, WO2006001860A2 and US2006231682A1.

These patents focus on the tooling that makes it possible to manufacture the complete structure (skin in one piece, stringers and frame feet) in just one curing process.

Patent US2006231682A1 is based on laying-up the basic structural elements individually and, using suitable tooling, curing them together. The problem that arises from this document is that, as it is necessary to carry out the lay-up and forming of many parts, the costs of manufacture are very high, and furthermore, loads are transferred between the various basic structural elements through the bonded interface, and there may be problems of debonding in said joining zones.

The present invention aims to solve the disadvantages that have arisen previously.

SUMMARY OF THE INVENTION

Thus, the present invention relates to an integrated structure of a fuselage of composite material for aircraft that comprises a basic skin, stringers, said stringers having an omega, T etc. cross-section, and U-shaped elements, all of the foregoing being co-cured. The composite material can be either carbon fibre or glass fibre with thermosetting or thermoplastic resin. The concept of integrated fuselage according to this invention is applicable both to one-shot fuselages and to panelled fuselages. The main field of application comprises fuselages of aeronautical structures, although the invention can also be applied to other structures with similar characteristics, for example torsion boxes for integrating rib booms.

According to the invention, a fuselage section is formed starting from individual U-section elements that assume various structural functions, forming part of the frame and of the skin at the same time. On joining these U-shaped elements with the basic skin and the stringers before the final phase of co-curing, the required complete integrated structure is obtained. This means having all the advantages that an integrated structure provides, such as cost saving in manufacture, since the composite material requires a fairly expensive curing process, and owing to integration the number of curing cycles and hence the costs are reduced, and at the same time it provides more uniform transmission of loads between the elements that make up the structure.

Thus, the aircraft fuselage structure according to the invention will integrate the skin with stringers and feet of the frames to benefit from the assembly advantages from using floating frames, as well as the simplification that results from manufacturing of said frames, without requiring a larger number of pieces and therefore without penalizing the number of joints.

Accordingly, the present invention relates, on the one hand, to an integrated aircraft fuselage structure with the following characteristics: the structure comprises a skin, stringers and frame feet, in such a way that the whole is integrated and a complete fuselage structure is obtained in a single piece, without the need to use rivets or joints; the frame feet of the aforesaid structure are formed from continuous U-shaped elements, which fulfil a dual structural function, acting both as skin and as T-shaped frame feet proper, of said fuselage structure; the frame feet of the invention, being integrated, do not need to be joined by rivets or bonded joints to the structure of the fuselage, thereby reducing the number of joints, thus avoiding the possibility of debonding and reducing the assembly time.

Moreover, the invention relates, on the other hand, to a method of manufacture of an integrated fuselage structure as has been described, said method comprising the following stages:

a) laying-up plies of composite material;
b) folding of the stacks to form the stringers of the structure;
c) folding of the stacks to form the U-shaped elements from which the frame feet of the structure are formed;
d) placing of the stringers and of the U-shaped elements in a curing tooling;
e) stacking or lay-up of a skin on the aforesaid assembly, formed by the stringers and the U-shaped elements;
f) consolidation of the aforesaid complete structure by the application of a single cycle of pressure and temperature.

Other characteristics and advantages of the present invention will become clear from the following detailed description of a typical embodiment of its object, referring to the accompanying drawings.

DETAILED DESCRIPTION OF THE INVENTION

Figure 1A:
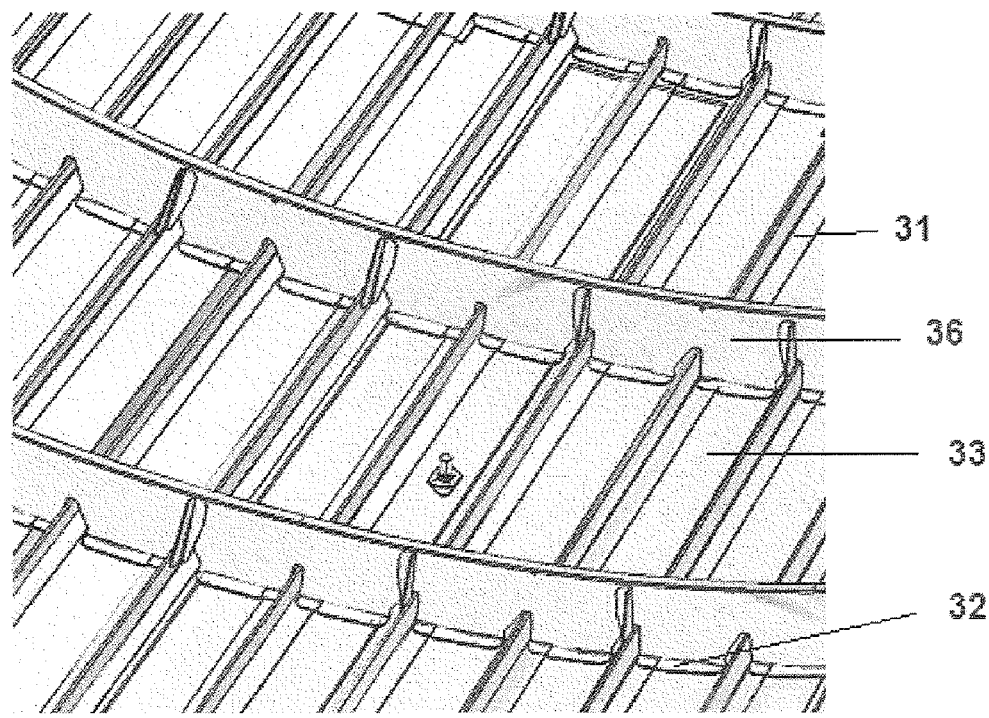
FIG. 1a shows, schematically, an aircraft fuselage with known complete frames.
Figure 1B:
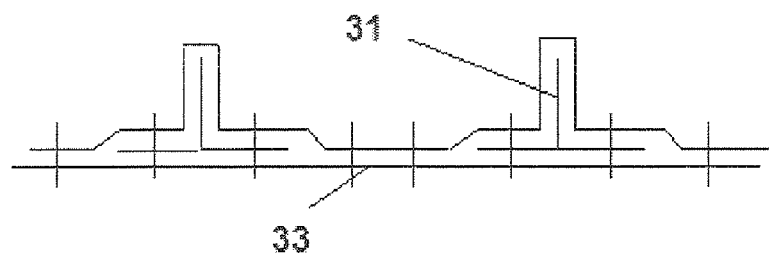
FIG. 1b shows a front view with T-shaped stringers of an aircraft fuselage assembly with known complete frames.
Figure 1C:
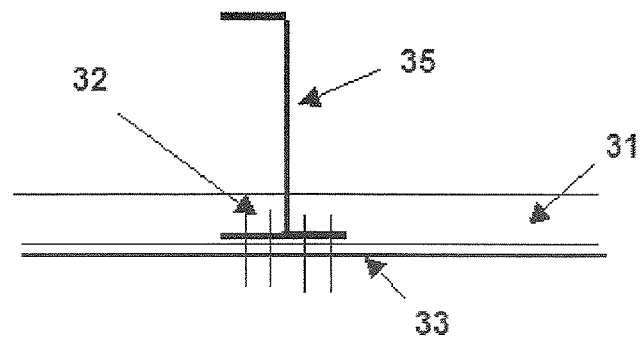
FIGS. 1c and 1e show a schematic diagram of the cross-section of an aircraft fuselage assembly with known complete frames.
Figure 1D:
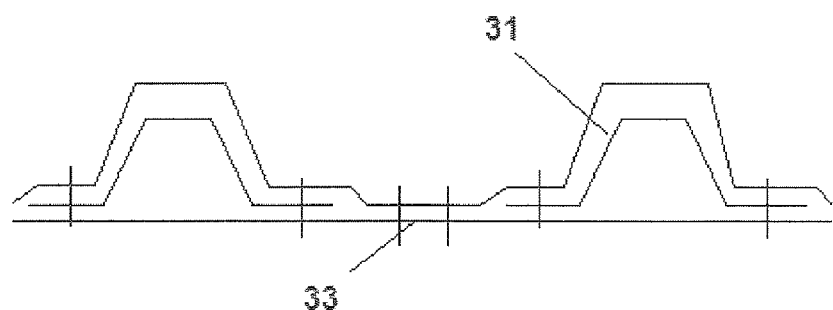
FIG. 1d shows a front view with omega-shaped stringers of an aircraft fuselage assembly with known complete frames.
Figure 1E:
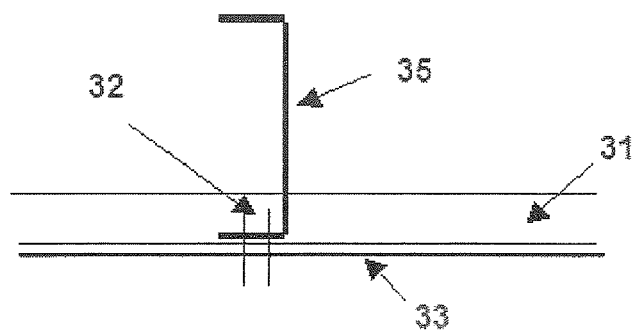
Figure 2A:
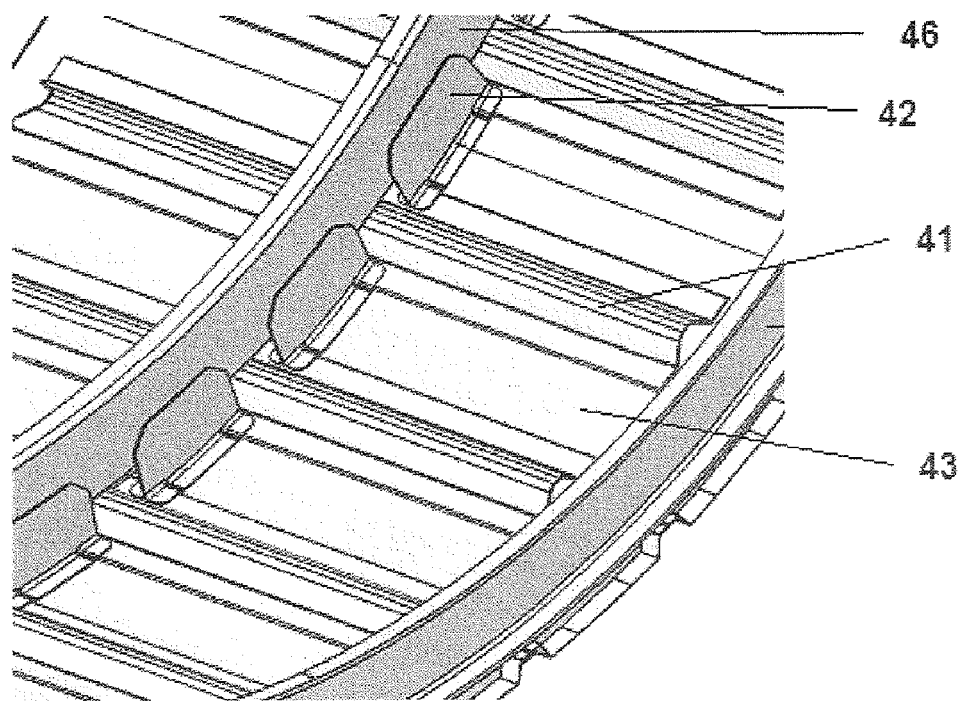
FIG. 2a shows, schematically, an aircraft fuselage with known floating frames.
Figure 2B:
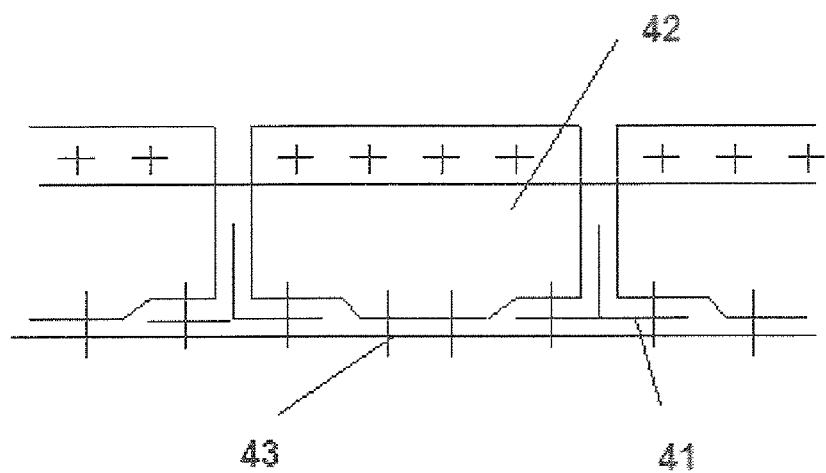
FIG. 2b shows a front view with T-shaped stringers of an aircraft fuselage assembly with known floating frames.
Figure 2C:
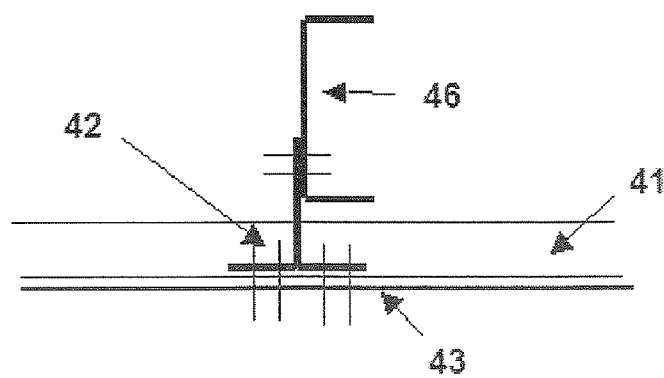
FIG. 2c shows a schematic diagram of the cross-section of an aircraft fuselage assembly with known floating frames.
Figure 2D:
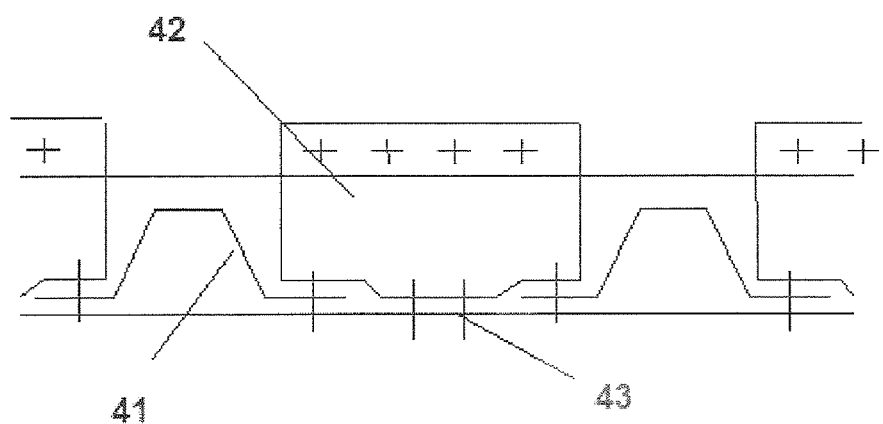
FIG. 2d shows a front view with omega-shaped stringers of an aircraft fuselage assembly with known floating frames.
Figure 3:
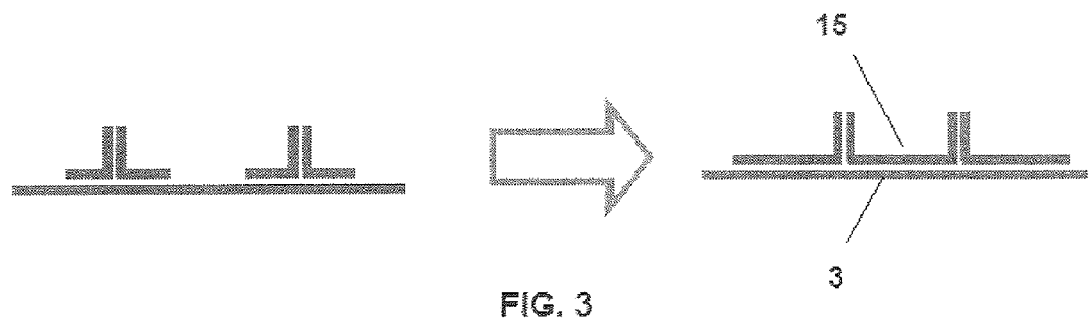
FIG. 3 shows the concept of integrated frame feet according to the present invention.
Figure 4A:
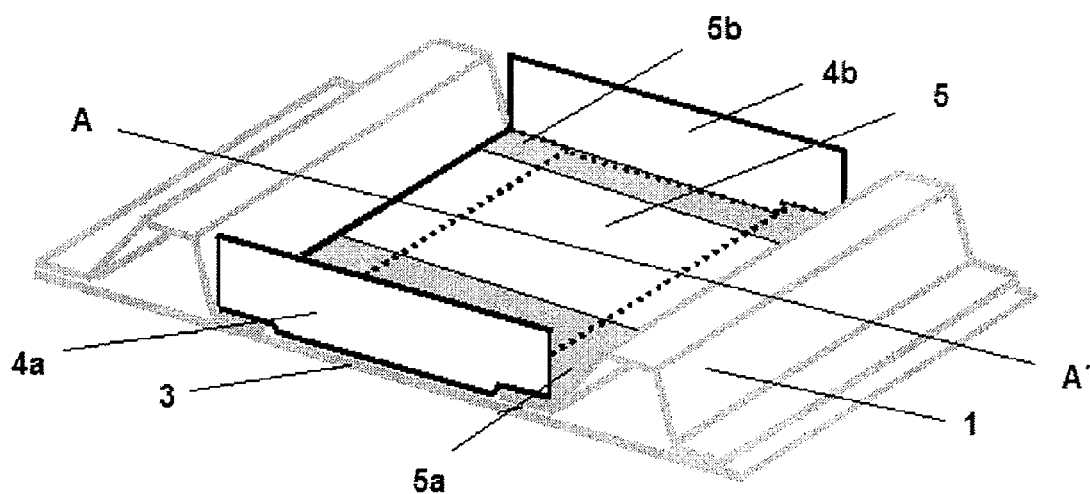
FIGS. 4a and 4b show, schematically, an aircraft fuselage including the concept of integrated frame feet both for omega-shaped and T-shaped stringers, respectively, according to the present invention.
Figure 4B:
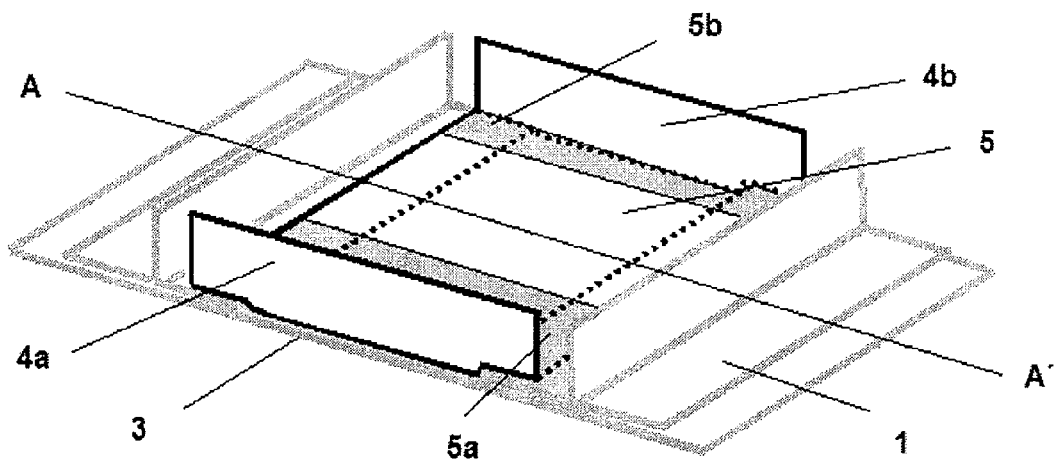
Figure 5A:
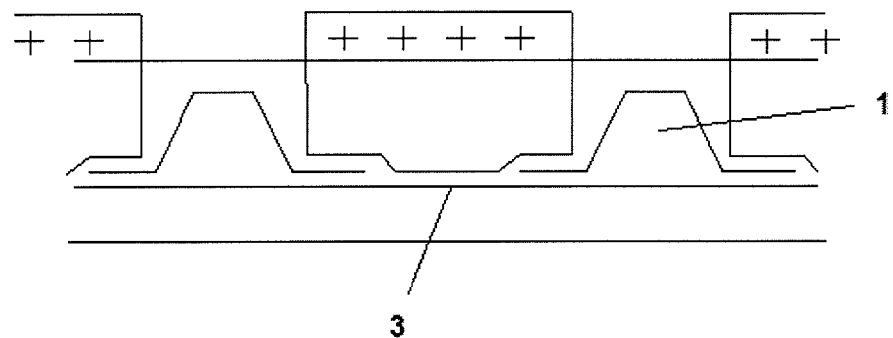
FIGS. 5a and 5b show section A-A' in FIGS. 4a and 4b for a fuselage both with omega-shaped and T-shaped stringers, respectively, according to the present invention.
Figure 5B:
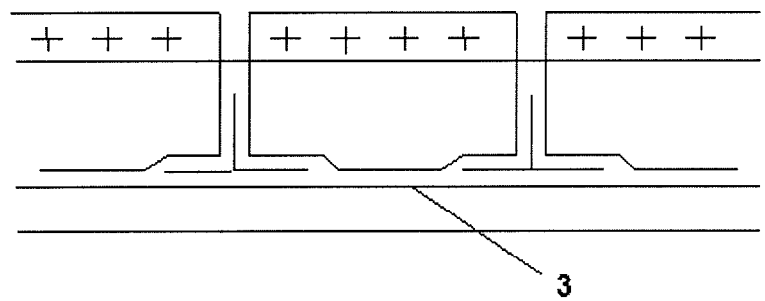

Aircraft fuselage structures that employ known complete frames comprise frames 36, which in their turn comprise a web 35, frame feet 32, stringers 31 and a skin 33, said feet 32 being riveted to the skin 33. The details of this configuration can be seen in FIGS. 1a-1e.

On the other hand, aircraft fuselage structures that employ known floating frames comprise, for the frame, two different pieces, a floating frame 46 as such and a foot 42. Moreover, they include a skin 43 to which the feet 42 are joined by rivets, and stringers 41, to which the aforesaid feet 42 are also joined. This structure can be seen in FIGS. 2a-d.

Thus, the present invention proposes a highly integrated aircraft fuselage structure that comprises a basic skin 3, longitudinal reinforcements or stringers 1 and U-shaped elements 15, in such a way that the integrated structure obtained is more efficient with respect to strength, stiffness and low weight. Moreover, such an integrated configuration means a saving in costs of manufacture and assembly.

The fuselage of the present invention comprises a basic skin 3, characterized in that it withstands transverse loads and principally loading in plane shear. To achieve sufficient axial stiffness of the basic skin 3 and stabilize it against buckling, without increasing its thickness, stringers 1 are introduced. The stringers 1 mainly withstand the longitudinal loads of the structure.

Furthermore, the fuselage of the invention further comprises multiple floating frames that primarily have to withstand the transverse loads of the structure, keeping the surface aerodynamic and preventing general instability of the fuselage. These floating frames will be riveted to the elements that form the frame feet of the invention.

Therefore, and from the structural standpoint, the fuselage according to the invention comprises:

a skin reinforced longitudinally with stringers;
floating frames, which will be riveted to the elements that form the frame feet, and
frame feet.

Figure 6:
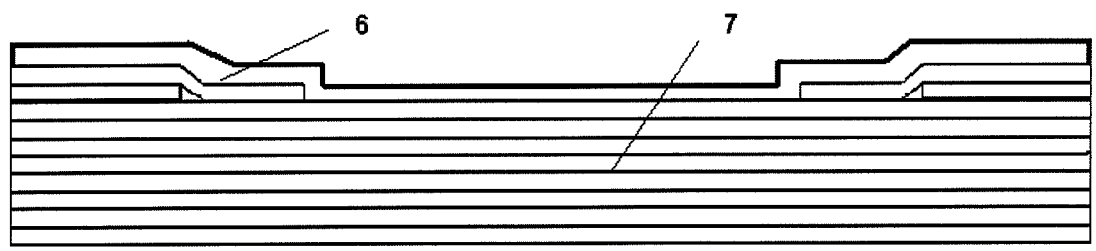
FIG. 6 shows, schematically in plan, the lay-up of the U-shaped element of the invention, including reinforcements, that integrate part of the skin of an aircraft fuselage and two L-shaped halves which, when joined to the L-shaped halves of the adjacent U-shaped elements, form an integrated T-shaped frame foot.

Moreover, the production process proposed by the invention is a further development of that described previously. At the moment of laying-up the layers of fibre 7, as can be seen from FIG. 6, U-shaped elements 15 will be formed individually according to the frame foot concept of the invention, comprising a part 5 and two L-shaped sections, 4a+5a and 4b+5b. Part 5, together with the basic skin 3, will integrate the complete skin of an aircraft fuselage. Moreover, the L-shaped sections 4a+5a and 4b+5b, of U-shaped element 15, when joined to the L-shaped sections of the adjacent U-shaped elements 15, will form an integrated structural T-shaped frame foot according to the invention. Each of the aforesaid elements performs various structural functions, and on joining them together we obtain the desired complete configuration. In a final stage the whole structure comprising basic skin 3, stringers 1 and U-shaped elements 15 is cured in a single cycle and a fully integrated fuselage structure is obtained.

The laminates of the U-shaped pieces 15 can include, if required, reinforcements 6 integrated in the folding zones to provide the precise extra thickness for the integrated T-shaped frame feet of the invention.

Thus, the invention provides, even from the lay-up of layers of fibre 7, real integration of the aforesaid structure, so that with the U-shaped elements, two structural functions are achieved at the same time: as frame feet and as skin. Laying-up the layers of fibre 7 is designed and optimized to perform this dual function described above. Moreover, as the frame feet are integrated, this solves the problem of possible debonding in the joining zones between frame feet and skin.

The composite material used in the elements of the structure can comprise carbon fibres or glass fibres. The resin will be of the thermoplastic or thermosetting type (epoxy, bismaleimide, phenolic etc.). The composite material can be pre-impregnated or dry fibre. The fuselage can be panelled (the skin is not a complete barrel but is made up of several panels) or it can be obtained from a complete barrel.

Figure 7:
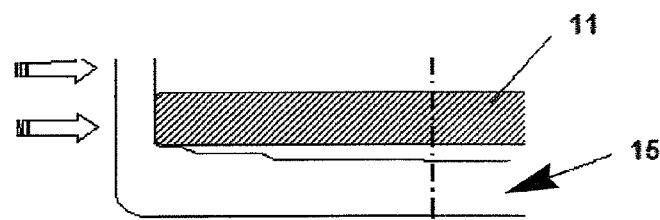
FIG. 7 shows, schematically, the folding of the integrated U-shaped elements according to the present invention.
Figure 8A:
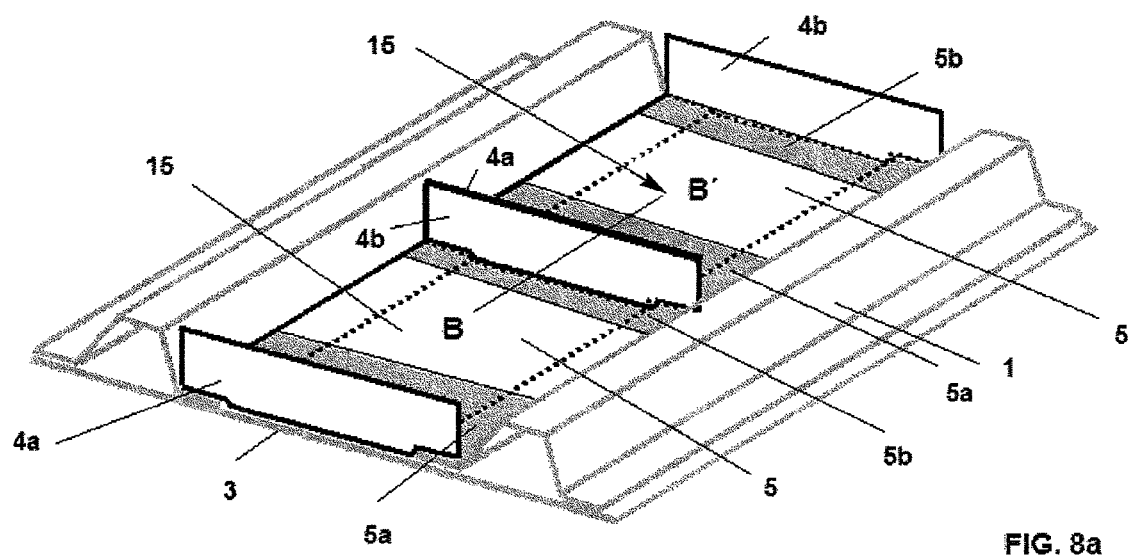
FIGS. 8a and 8b show the joining of two U-shaped elements according to the concept of integrated frame foot, both for omega-shaped and T-shaped stringers, respectively, according to the present invention.
Figure 8B:
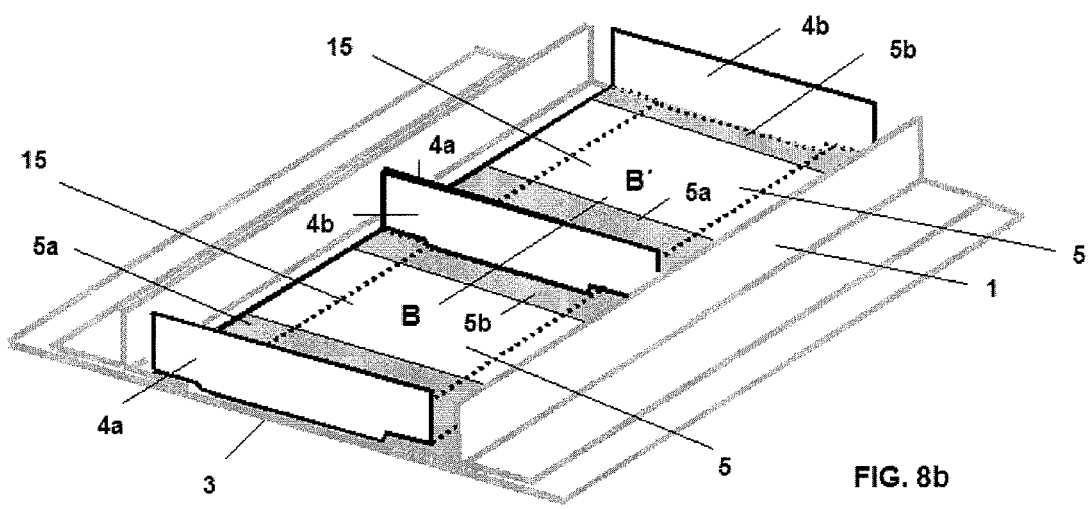
Figure 9:
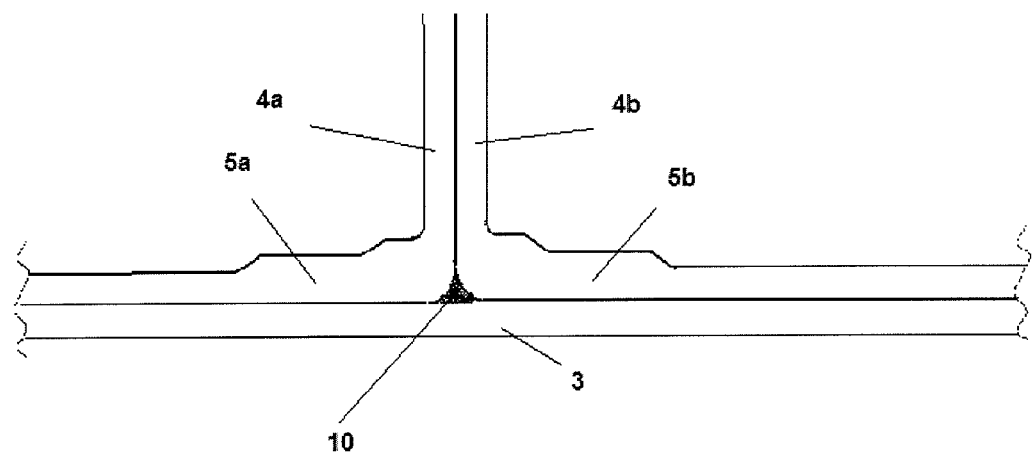
FIG. 9 shows section B-B' of FIGS. 8a and 8b, indicating the position of the roving in the joining of the U-shaped elements that form the integrated frame feet of the present invention.

The detailed steps of a preferred manufacturing process for the production of a complete aircraft fuselage in a single piece are described below. The process comprises the following stages:

a) first, the layers of composite material 7 are lay-up on a flat or curved base, by a manual or automatic method (automated tape layer, fibre placement, etc.), which make up the U-shaped elements 15: these stacks can also include reinforcements 6 both longitudinally and transversely for optimizing the lay-up at any section, depending on whether it will form part of a skin panel or of a frame foot;

b) then, using a manual or automatic method (automated tape layer, fibre placement, etc.), the layers of composite material that make up the stringers 1 are lay-up;

c) next, the stack obtained in stage a) is folded to form the U-shaped pieces 15: this folding can be carried out in various ways, for example by the application of a cycle of temperature and vacuum that moulds the stack with the required geometry by means of a suitable tool 11, which copies its internal geometry, FIG. 7;

d) then, the stack obtained in stage b) is folded to form the stringers 1;

e) then, the separate U-shaped elements 15 are placed in the curing tooling together with the stringers 1, FIGS. 8a and 8b; it is possible that in this stage it may be necessary to introduce roving 10 (unidirectional strips of fibre, which must be of the same material as used in the stacks or a compatible material) to prevent porosity, accumulations of resin and thus ensure optimum co-curing, FIG. 9;

f) in the next stage the basic skin 3 is lay-up or stacked, either the whole barrel continuously (one-shot) or divided into panels, by a manual or automatic process (fibre placement, etc.): the tooling for carrying out this process can be conical, cylindrical or a sector of said cone or of said cylinder, depending on whether it is a one-shot process (cylindrical or conical section) or a panelled section;

g) in the next stage the complete structure is cured by the application of a single cycle of pressure and temperature, with the aid of an appropriate system of tooling that can be inside or outside the structure, to provide adequate compaction of all of the zones of said structure, and the complete structure can be co-cured (if all of the parts, basic skin 3, stringers 1 and U-shaped elements 15 are not cured), co-bonded (for example, if the U-shaped elements 15 were previously cured) or secondary bonded.

In the case when U-shaped elements 15 have been cured previously (co-bonding), whether the composite material is a prepreg or preimpregnated material, or dry fibre, the aforesaid process includes an additional stage, prior to stage e), namely a stage for curing the U-shaped elements 15. If the composite material is dry fibre, Resin Transfer Moulding (RTM) processes will be used.

In the embodiments that we have just described, it is possible to introduce the modifications within the scope defined by the following claims.

The invention claimed is:

1. Aircraft fuselage structure made of composite material comprising:
   a skin; and mounted thereon:
   at least one set of frame feet comprising a plurality of linearly arranged frame feet and
   a plurality of stringers disposed orthogonally to said set of frame feet and extending between adjacent frame feet,
   wherein said frame feet are formed of U-shaped elements each of which U-shaped element being located between but not extending through adjacent stringers and comprising two L-shaped sections which together with a skin part form said U-shaped element in such a way that these U-shaped elements perform two structural functions in said structure at the same time, acting as frame feet and as skin, providing an integrated fuselage structure without rivets or joints.

2. Aircraft fuselage structure made of composite material according to claim 1, the U-shaped elements include reinforcements for providing predetermined extra thickness in zones of said elements.

3. Aircraft fuselage structure made of composite material according to claim 1, wherein the composite material comprises carbon fibres or glass fibres.

4. Aircraft fuselage structure made of composite material according to claim 1, wherein the resin of the composite material is of the thermosetting or thermoplastic type.

5. Aircraft fuselage structure made of composite material according to claim 1, wherein the composite material is pre-impregnated or is dry fibre.

6. Aircraft fuselage structure made of composite material according to claim 1, wherein the fuselage is panelled.

7. Aircraft fuselage structure made of composite material according to claim 1, wherein the fuselage structure is in the form of a complete barrel.

8. Method of manufacture of an integrated aircraft fuselage structure made of composite material according to claim 1, wherein it comprises the following stages:
   a) lay-up of layers of composite material which make up the U-shaped elements;
   b) lay-up of the layers of composite material that make up the stringers;

c) folding of the stack obtained in stage a) to form the U-shaped elements;

d) folding of the stack obtained in stage b) to form the stringers;

e) placement of the U-shaped elements in curing tooling together with the stringers, said U-shaped members being arranged orthogonally to said stringers and arranged such that stringers pass between adjacent U-shaped members;

f) lay-up of the skin, and g) curing of the complete structure by the application of pressure and temperature, ensuring adequate compaction of all the zones of said structure.

9. Method of manufacture of an integrated aircraft fuselage structure according to claim 8, wherein the lay-up of the layers of composite material in stages a) and b) is carried out by a manual or automatic method.

10. Method of manufacture of an integrated aircraft fuselage structure according to claim 8, wherein that the stacks of the U-shaped elements (15) from stage a) include reinforcements (6) both longitudinally and transversely for optimizing said stacks.

11. Method of manufacture of an integrated aircraft fuselage structure according to claim 8, wherein in stage c), the folding of the U-shaped elements is carried out by a cycle of temperature and vacuum, using a tooling.

12. Method of manufacture of an integrated aircraft fuselage structure according to claim 8, wherein, in stage e), roving is introduced to prevent hollows, accumulations of resin and to ensure optimum co-curing.

13. Method of manufacture of an integrated aircraft fuselage structure according to claim 8, wherein in stage f), a conical or cylindrical tooling or a sector is used, depending on whether it is a one-shot process or a panelled section.

14. Method of manufacture of an integrated aircraft fuselage structure according to claim 8, wherein the integrated structure is co-cured, co-bonded or secondary bonded.

15. Method of manufacture of an integrated aircraft fuselage structure according to claim 8, wherein, prior to stage e), in the case when the U-shaped elements have been cured previously, there is an additional stage of curing by Resin Transfer Moulding (RTM) when the composite material is dry fibre.

* * * * *